United States Patent Office 2,742,362
Patented Apr. 17, 1956

2,742,362

ANIMAL FEED COMPOSITIONS

John Alfred Aeschlimann and Benjamin Tabenkin, Montclair, N. J., assignors to Hoffmann-La Roche Inc., Nutley, N. J., a corporation of New Jersey No Drawing. Application May 24, 1954,
Serial No. 432,023

6 Claims. (Cl. 99—4)

This invention relates to feed compositions containing growth promoting agents, more particularly, to animal and poultry feed compositions containing $N^1$-acyl-3,4-dimethyl-5-sulfanilamido isoxazoles.

It has been found that $N^1$-acyl-3,4-dimethyl-5-sulfanilamido isoxazoles have growth promoting effects on animals and poultry. When these compounds are incorporated in the feed compositions for animals and poultry such as swine, ruminants and edible fowl, more rapid growth and greater feed efficiency are obtained than can be procured on conventional diets. These growth promoting agents are essentially tasteless, substantially water-insoluble compounds which are rendered readily absorbable in the alimentary tract by enzymatic action.

The $N^1$-acyl-3,4-dimethyl-5-sulfanilamido isoxazoles are represented by the following formula:

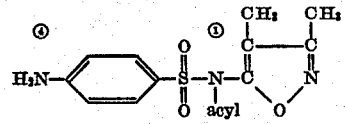

In the formula, "acyl" is any acyl radical. For example, the acyl group in the compounds of this invention includes saturated or unsaturated aliphatic carboxylic acid acyl, such as acetyl, propionyl, butyryl, oleoyl and lauroyl, and aromatic carboxylic acid acyl, e. g. benzoyl. A preferred class includes those compounds in which the acyl group is an alkanoyl group of the lower fatty acid series or higher fatty acid series. The foregoing isoxazole compounds are prepared by reacting, in about equimolecular proportions, 3,4-dimethyl-5-sulfanilamido isoxazole with an acid anhydride containing the desired acyl group in the presence of an inert organic solvent such as acetone and a catalytic agent such as pyridine under substantially anhydrous conditions. The isoxazole compounds produce a positive Bratton-Marshall reaction and a positive Hucknall-Turfitt reaction.

The $N^1$-acyl-3,4-dimethyl-5-sulfanilamido isoxazole compound may be incorporated in animal or poultry feeds or feed concentrates intended for chickens, turkeys, calves, pigs and the like. The growth promoting compound is intimately admixed with the animal or poultry feed in an amount of 0.01% to 1% by weight, based on the final feed composition. Animal and poultry feeds which elicit a favorable growth response when an $N^1$-acyl-3,4-dimethyl-5-sulfanilamido isoxazole is contained in the formula include chick starter, broiler and grower feeds, laying mashes, breeder and turkey breeder mashes, turkey starter and grower feeds, pig and sow feeds, hog feeds, hog supplements, cattle feed, calf feed, etc.

Other feed supplements, vitamins and amino acids, for example, may be included in the final feed composition if desired.

Example 1

50 grams of $N^1$-acetyl-3,4-dimethyl-5-sulfanilamido isoxazole were thoroughly admixed with 250 grams of "Start and Grow" chick mash (manufactured by GLF Feed Co-Operative Mills) comprising whole corn meal, flour midds, soy bean meal, ground oats, meat scrap, distillers solubles, alfalfa meal, dried whey, fish meal, dried skim milk, ground limestone, dicalcium phosphate, riboflavin concentrate, sodium chloride, cod liver oil, delsterol and trace minerals to form a first premix. The first premix, comprising 300 grams, was thoroughly mixed with an additional kilogram of the "Start and Grow" chick mash, forming a second premix. The second premix was in turn admixed with 3,700 grams of the chick mash until thoroughly blended to provide 5 kg. of fortified feed for baby chicks.

Example 2

A swine feed is formed by blending, in the same manner as described in the preceding example, 50 grams of $N^1$-acetyl-3,4-dimethyl-5-sulfanilamido isoxazole with 4,950 grams of a pig and sow formula comprising ground yellow corn, wheat bran, wheat midds, ground whole oats, alfalfa meal, soy bean oil meal, meat scraps, tankage, steamed bone meal, ground limestone and salt.

We claim:

1. A feed composition containing a compound having the following formula:

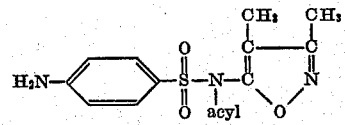

2. A composition according to claim 1 wherein the proportion of the compound is 0.01% to 1% by weight.

3. A feed composition according to claim 1 wherein the acyl group is an alkanoyl group.

4. An animal and poultry feed composition comprising an animal feed material and a minor proportion of a compound having the formula

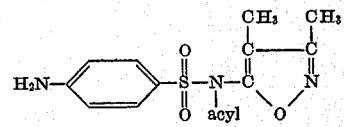

5. A feed composition comprising an animal feed material and a minor proportion of $N^1$-acetyl-3,4-dimethyl-5-sulfanilamido isoxazole.

6. A feed composition comprising an animal feed material and 0.01% to 1% of $N^1$-acetyl-3,4-dimethyl-5-sulfanilamido isoxazole by weight.

References Cited in the file of this patent

UNITED STATES PATENTS 2,680,135    Gregory _____ June 1, 1954

OTHER REFERENCES

Tabenkin et al.: Reprint from Proceedings of Soc. for Exp. Biol. and Med. (1953), vol. 83, 88–91, received for publication January 29, 1953.